United States Patent [19]

Chiba et al.

[11] Patent Number: 4,601,756
[45] Date of Patent: Jul. 22, 1986

[54] RECORDING LIQUID

[75] Inventors: Masahiro Chiba; Kazuo Iwata, both of Yokohama; Tadayuki Nakousai, Atsugi; Hiroko Ogawa, Chigasaki; Takashi Ohba, Hiratsuka, all of Japan

[73] Assignee: Canon Kabushiki Kaisha, Tokyo, Japan

[21] Appl. No.: 661,081

[22] Filed: Oct. 15, 1984

[30] Foreign Application Priority Data

Oct. 19, 1983 [JP] Japan ............................. 58-194076
Oct. 19, 1983 [JP] Japan ............................. 58-194077
Oct. 19, 1983 [JP] Japan ............................. 58-194078
Oct. 19, 1983 [JP] Japan ............................. 58-194079

[51] Int. Cl.$^4$ ............................................. C09D 11/02
[52] U.S. Cl. ......................................................... 106/22
[58] Field of Search ...................................... 106/22, 20

[56] References Cited

U.S. PATENT DOCUMENTS 4,168,662  9/1979  Fell ........................................ 106/22
4,197,135  4/1980  Bailey et al. ........................... 106/23

*Primary Examiner*—Amelia B. Yarbrough
*Attorney, Agent, or Firm*—Fitzpatrick, Cella, Harper & Scinto

[57] ABSTRACT

A recording liquid comprises a liquid composition containing water-soluble dyes as coloring component, characterized in that C.I. Food Black 2 and one or more dyes in different color or colors are used in combination as said coloring component.

8 Claims, No Drawings

RECORDING LIQUID

BACKGROUND OF THE INVENTION

1. Field of the Invention

The present invention relates to a recording liquid suitable for use in the ink jet recording process in which droplets of recording liquid called an ink are flown from a recording head through its orifices to perform recording, or for other recording by means of a writing tool, and more particularly to a recording liquid giving an ideal black or blue black color.

2. Description of the Prior Art

Ink-jet recording generates less noise and permits a high speed recording on plain paper without the necessity for any special fixing treatment, so that various types of ink-jet recording systems are being investigated energetically.

The recording liquid used for these ink jet recording systems needs to fulfill the following requirements such that its physical properties such as viscosity, surface tension, etc. should be each within a proper range, it should not clog a fine spout (orifice), it should form images of bright color tone and of sufficiently high optical density, and it should not undergo a change in physical properties or deposit solid matter, during storage.

In addition, the recording liquid is desired to meet the following requirements as recording therewith should be accomplished without particular restriction of the kind of recording medium, including paper, which is the most typical recording medium, it should exhibit a high rate of fixing on recording media, it should give images excellent in resistances to water, solvent (particularly alcohol), light, and attrition, and it should form images with a high degree of resolution.

Since the recording liquid used for ink-jet recording is composed basically of a cloloring component dye and its solvent, the above performance characteristics required are much affected by inherent properties of the dye. Accordingly, it is very important in the art to select a dye so as to provide the recording liquid with the above performance characteristics.

The solubility of the dye in the liquid medium is particularly important; it is essential for maintaining a good anti-clogging property and solution stability of the recording liquid that the dye be sufficiently soluble in water as well as in the wetting agent used, which is generally composed of an organic solvent.

On the other hand, for performing black color printing, a recording liquid giving a primary black color or a primary blue black color is used. Furthermore, for reproduce full-color recorded images, recording liquids of four primary colors including three primary colors (magenta, yellow and cyan) and a black primary color are used, wherein the color tone of a recorded image is governed by subtractive mixing of these recording liquids. In order to form images of desired color tone, it is required that these recording liquids of three primary colors have ideal hues of primary colors, as magenta, yellow and cyan without a tinge of any other color, and also that the black recording liquid has pure black color tone without a tinge of any other color. Therefore, it is also very important in the art to select properly dyes as coloring component taking the color tone given by a black or blue black recording liquid into consideration.

However, almost none of the known recording liquids in black color or blue black color, satisfy the above noted requirements, particularly with respect to solubility, color tone and light resistance. Thus, a black or blue black recording liquid meeting the above requirements has been strongly desired.

SUMMARY OF THE INVENTION

An object of this invention is to provide a recording liquid which is excellent in the solubility of the coloring component in the liquid components and in the long-term solution stability and does not tend to clog discharging orifices.

Another object of this invention is to provide a recording liquid which gives an ideal black color or blue black color as primary color and is excellent in light resistance.

According to the first aspect of the present invention, there is provided a recording liquid comprising a liquid composition containing water-soluble dyes as coloring component, characterized in that C.I. Food Black 2 and one or more dyes in different color or colors are used in combination as said coloring component.

According to the second aspect of the present invention, there is provided a recording liquid comprising a liquid composition containing water-soluble dyes as coloring component, characterized in that C.I. Food Black 2 and one or more blue color dyes are used in combination as said coloring component.

According to the third aspect of the present invention, there is provided a recording liquid comprising a liquid composition containing water-soluble dyes as coloring component, characterized in that C.I. Food Black 2 and one or more yellow color dyes and/or one or more red color dyes are used in combination as said coloring component.

DESCRIPTION OF THE PREFERRED EMBODIMENTS

C.I. Food Black 2 used as the main component of the recording liquid of the present invention is very excellent in the characteristics such as solubility, light resistance, etc. which are important for the recording liquid applied to the ink jet recording process described above. However, C.I. Food Black 2 alone can not necessarily be used suitably for the coloring matter giving a primary black color or a primary blue black color since it gives a slightly faded black color with a tinge of blue.

This invention satisfactorily achieves the foregoing objects by using C.I. Food Black 2 and one or more dyes in different color or colors in combination.

Examples of dyes in different color used in combination with C.I. Food Black 2 in this invention include blue color dyes, yellow color dyes, red color dyes, etc.

For blue color dyes, although various dyes may be used, it is preferable to use one or more dyes selected from the group consisting of C.I. Acid Blue 9, C.I. Acid Blue 13, C.I. Acid Blue 68, C.I. Acid Blue 69, C.I. Acid Blue 138, C.I. Acid Blue 185, C.I. Acid Blue 249, C.I. Acid Blue 258, C.I. Direct Blue 83, C.I. Direct Blue 86, C.I. Direct Blue 87, C.I. Direct Blue 95, C.I. Direct Blue 149, C.I. Direct Blue 166, C.I. Direct Blue 176 and C.I. Direct Blue 199 since these dyes are excellent in the characteristics such as solubility, light resistance, etc. which are important for the recording liquid applied to the ink jet recording process described above.

In the present invention, C.I. Food Black 2 and one or more blue color dyes are used in combination. Thus, by adding blue color dyes to C.I. Food Black 2 giving a slightly faded black color tinged with blue, there can be obtained a recording liquid which gives an ideal primary black color of pure tone tinged with blue or the so-called primary blue black color which is preferred for printing rather than pure black. The thus obtained recording liquid is also excellent in important characteristics such as solubility, solution stability, light resistance, etc.

The mixing ratios of C.I. Food Black 2 and blue color dyes may vary depending on the combination thereof and the desired color tone since color tone or color intensity of respective blue color dyes are different each other, and the desired color tone will vary according to whether the resulting recording liquid is used as primary black color for subtractive mixing or as primary blue black color for printing. However, weight ratios of blue color dyes to C.I. Food Black 2 should preferably be selected within the range of 1:10 to 10:1. When the weight ratio of blue color dyes to C.I. Food Black 2 is less than 1:10, the slightly faded black color tinged with blue of C.I. Food Black 2 is not sufficiently corrected. On the contrary, when the above ratio is greater than 10:1, the resulting recording liquid is so tinged with blue that it loses even the minimum black color tone required for the primary blue black color.

For red color dyes used in combination with C.I. Food Black 2 in the present invention, it is preferable to use one or more dyes which exhibit their absorption maxima within the range of 600 to 700 nm and are excellent in the characteristics such as solubility, light resistance, etc. which are important for the recording liquid applied to the ink jet recording process described above.

Among such red color dyes, there may preferably be mentioned, for example, C.I. Acid Red 8, C.I. Acid Red 37, C.I. Acid Red 50, C.I. Acid Red 51, C.I. Acid Red 52, C.I. Acid Red 87, C.I. Acid Red 92, C.I. Acid Red 93, C.I. Acid Red 95, C.I. Acid Red 98, C.I. Acid Red 287, C.I. Acid Red 35, C.I. Acid Red 1, and the like.

By using as coloring component C.I. Food Black 2 and one or more red color dyes as defined above in combination, the slightly blueish black color tone of C.I. Food Black 2 can be counterbalanced with red color dyes to obtain a recording liquid which gives an ideal primary black color and is excellent in the important characteristics such as solubility, solution stability, light resistance, etc.

The mixing ratios of one or more red color dyes to C.I. Food Black 2 may vary depending on the combination thereof since color tone or color intensity of respective red color dyes are different each other. However, weight ratios of one or more red color dyes to C.I. Food Black 2 should preferably be selected within the range of 1:100 to 30:100. When the weight ratio of one or more red color dyes to C.I. Food Black 2 is less than 1:100, the slightly blueish black color tone of C.I. Food Black 2 is not sufficiently improved. On the contrary, when the above ratio is greater than 30:100, the resulting recording liquid gives reddish black color which is undesirable.

For yellow color dyes used in combination with C.I. Food Black 2 in the present invention, it is preferable to use one or more dyes which exhibit their absorption maxima within the range of 350 to 499 nm and are excellent in the characteristics such as solubility, light resistance, etc. which are important for the recording liquid applied to the ink jet recording process described above.

Among such yellow color dyes, there may preferably be mentioned, for example, C.I. Acid Yellow 17:1, C.I. Acid Yellow 23, C.I. Acid Yellow 49, C.I. Acid Yellow 65, C.I. Acid Yellow 104, C.I. Acid Yellow 183, C.I. Acid Yellow 155, C.I. Acid Yellow 194, C.I. Direct Yellow 86, C.I. Direct Yellow 106, C.I. Direct Yellow 142, C.I. Direct Yellow 194, and the like.

By using as coloring component C.I. Food Black 2 and one or more yellow color dyes as defined above in combination, the slightly blueish black color tone of C.I. Food Black 2 can be counterbalanced with yellow color dyes to obtain a recording liquid which gives an ideal primary black color and is excellent in the important characteristics such as solubility, solution stability, light resistance, etc.

The mixing ratios of one or more yellow color dyes to C.I. Food Black 2 may vary depending on the combination thereof since color tone or color intensity of respective yellow color dyes are different each other. However, weight ratios of one or more yellow color dyes to C.I. Food Black 2 should preferably be selected within the range of 1:100 to 30:100. When the weight ratio of one or more yellow color dyes to C.I. Food Black 2 is less than 1:100, the slightly blueish black color tone of C.I. Food Black 2 is not sufficiently improved. On the contrary, when the above ratios is greater than 30:100, the resulting recording liquid gives yellowish black color which is undesirable.

In the foregoing, the combined use of C.I. Food Black 2 and one or more dyes in another color for coloring component has been described. However, it is to be realized, of course, that the present invention also includes a combined use of C.I. Food Black 2 and two or more dyes in other colors. An example of such a combination is C.I. Food Black 2, one or more yellow color dyes and one or more red color dyes. In this case, the aforesaid yellow color dyes and red color dyes may preferably be used.

By using as coloring component C.I. Food Black 2 in combination with one or more yellow color dyes and one or more red color dyes as defined above, the slightly blueish black color tone of C.I. Food Black 2 can be counterbalanced through the harmonious action of one or more yellow color dyes and one or more red color dyes to obtain a recording liquid which gives an ideal primary black color and is excellent in the important characteristics such as solubility, solution stability, light resistance, etc.

The mixing ratios of one or more yellow color dyes or one or more red color dyes to C.I. Food Black 2 may vary depending on the combinations thereof since color tone or color intensity of respective yellow color dyes or red color dyes are different each other. However, weight ratios of one or more yellow color dyes or one or more red color dyes to C.I. Food Black 2 should preferably be selected within the range of 1:100 to 30:100. When the weight ratio of one or more yellow color dyes or one or more red color dyes to C.I. Food Black 2 is less than 1:100, the slightly blueish black color tone of C.I. Food Black 2 is not sufficiently improved. On the contrary, when the above ratio is greater than 30:100, the resulting recording liquid gives an yellowish or reddish black color which is undesirable. In order to obtain effectively a well-balanced ideal primary black color, the weight ratio of one or more yellow color dyes to one or more red color dyes should preferably be selected within the range of 10:1 to 1:10. When this ratio is greater than 10:1, the effect by the addition of red color dyes can not be recognized. On the contrary, this ratio is less than 1:10, the effect by the addition of yellow color dyes can not be recognized.

The content of the dyes as coloring component to be used in the recording liquid, that is, the total content of C.I. Food Black 2 and one or more dyes in different color or colors may vary depending on the kinds of liquid medium components, the characteristics required for the recording liquid, etc., and is in the range of generally 0.5-20%, preferably 0.5-15%, and particularly 1-10%, by weight based on the total weight of the recording liquid.

The recording liquid of this invention contains water as the main liquid component. The liquid may consist of water alone or preferably a mixture of water with a water-miscible organic solvent.

Water-miscible organic solvents suitable for the liquid medium include, for example; aliphatic alcohols having one to four carbon atoms such as methanol, ethanol, n-propanol, isopropanol, n-butanol, sec-butanol, tert-butanol, and isobutanol; amides such as dimethlformamide and dimethylacetamide; ketones or keto-alcohols such as acetone and diacetone alcohol; ethers such as tetrahydrofuran and dioxane; nitrogen-containing heterocyclic ketones such as N-methye-2-pyrrolidone and 1,3-dimethye-2-imidazolidinone; polyalkylene glycols such as pholyethylene glycol and polyproplylene glycol; glycols of $C_2$-$C_6$ alkylenes such as ethylene glycol, propylene glycol, butylene glycol, triethylene glycol, 1,2,6-hexanetriol, thiodi-glycol, hexylene glycol and diethylene glycol; glycerol; and lower-alkyl ethers of polyhydric alcohols such as ethylene glycol methyl ether, diethylene glycol methyl (or ethyl) ether, and triethylene glycol monomethyl (or ethyl) ether.

Preferred solvents among these are polyhydric alcohols including diethylene glycol and lower alkyl ethers of polyhydric alcohols including triethylene glycol monomethyl (or ethyl) ether.

The content of the water-miscible organic solvent in the recording liquid is in the range of generally 5-95%, preferably 10-80%, and particularly 20-50%, by weight based on the total weight of the recording liquid.

The water content in the liquid is decided depending on the kind and composition of the above solvent and the characteristics required for the recording liquid in a wide range of generally 10-90%, preferably 10-70%, and particularly 20-70%, by weight based on the total weight of the recording liquid.

The recording liquid of this invention, prepared from the components mentioned above in itself has excellent and balanced recording performance characteristics (signal responsiveness, stability of droplet formation, discharge stability, long-time continuous recording workability, and discharge stability after a long rest), storage stability, fixability on recording media, and resistances of the resulting images to light, weather and water. For further improving these characteristics, known various additives may also be incorporated into the recording liquid. The examples of these additives are viscosity modifiers such as polyvinyl alcohol, cellulosic materials, and other water-soluble resins; various types of cationic, anionic and nonionic surfactants; surface tension modifiers such as diethanolamine and triethanol-amine; pH regulators containing buffer solutions: antimolds; and the like.

When the recording liquid is used in the ink-jet recording system which discharges a recording liquid by the action of thermal energy, thermal properties (e.g. specific heat, thermal expansion coefficient, and heat conductivity) of the recording liquid may be adjusted if necessary.

While having excellent characteristics for ink-jet recording, the recording liquid of this invention may also be used favorably for writing on recording media such as paper by means of writing tools such as fountain pens, felt pens and the like.

As described above in detail, this invention provides a recording liquid which has the following advantages: its viscosity and surface tension are each in a proper range: it does not clog a fine orifice; it gives sufficiently dense images; during storage, no change occurs in its physical properties and no precipitate forms; it is applicable on various recording media without no particular restriction; and it gives images quickly fixable and excellent in resistances to water, light and attrition and in degree of resolution.

This invention is illustrated in more detail with reference to the following Examples.

EXAMPLE 1

A primary blue black recording liquid for an ink jet recording was prepared according to the following formulation.

| | |
|---|---|
| C.I. food black 2 | 2 parts by weight |
| C.I. acid blue 9 | 2 parts by weight |
| Diethyleneglycol | 30 parts by weight |
| N—methyl-2-pyrrolidone | 15 parts by weight |
| Deionzed water (hereinafter abbreviated as water) | balance |
| Total: | 100 parts by weight |

The above amounts of the components were thoroughly mixed to form a homogeneous solution, which was then pressure-filtered through a teflon filter having a nominal pore size of 0.45μ. The filtrate was degassed with vacuum pump and made up into a recording liquid.

This recording liquid was tested for its discharge stability by using an ink-jet recorder equipped with an on-demand type of recording head which ejects recording liquid droplets by means of a piezoelectric oscillator (orifice diameter: 50μ, piezoelectric oscillator driving voltage: 60 V, frequency: 4 KHz). As a result, this recording liquid maintained good discharge stability in both cases of continuous discharge and intermittent discharge for 48 hours, at surrounding temperatures of 5°, room temperature (21°), 40°, and 60° C., under a relative humidity of 30%.

Separate from the above test, long term storage stability of the recording liquid was tested for two years at 0° C., 30° C. and 60° C. No precipitation and color change occurred in the recording agent.

The printed letters exhibited an ideal clear color and black color which was not tinged with other tone. They also showed such good light resistance that the letters could sufficiently be read after 50 hour exposure in a xenon Fade-O-Meter.

EXAMPLE 2

A primary black recording liquid was prepared on the basis of the following formulation in the same manner as in Example 1.

| | |
|---|---|
| C.I. food black 2 | 4 parts by weight |
| C.I. direct blue 199 | 0.5 parts by weight |
| Diethyleneglycol | 15 parts by weight |
| 1,3-dimethyl-2-imidazolidinone | 15 parts by weight |
| Polyethyleneglycol (300) | 15 parts by weight |
| Water | balance |
| Total: | 100 parts by weight |

On the other hand, a primary yellow recording liquid, a primary cyan recording liquid and a primary magenta recording liquid were prepared on the basis of the above-mentioned forumulation except that, in face of C.I. food black 2 and C.I. acid red 37 in the aforesaid primary black recording liquid, C.I. acid yellow 23 in the primary yellow recording liquid, C.I. direct blue 86 in the primary cyan recording liquid and C.I. acid red 35 in the primary magenta recording liquid were combined up to 2 weight %, respectively.

Color printing test were conducted by feeding these recording liquids to an ink-jet recorder equipped with multi-heads of on-demand type which ejects recording liquid droplets by the action of thermal energy (orifice diameter 35$\mu$, electric resistance of the heater 150$\Omega$, operational voltage 30 V, frequency 2 KHz). The results revealed that the discharge stability was good in all cases under the same conditions as in Example 1. The resulting full-color images had the ideal colors, whereby these recording liquids were found to be excellent as primary color liquids for use in subtractive color mixing. The same light exposure test as in Example 1 showed that the printed letters could also sufficiently be read after said exposure.

EXAMPLES 3–10

A primary blue black recording requid was prepared in the same manner as in Example 1 except that dye as shown in Table 1 and its formulation contents were used in place of C.I. food black 2 and C.I. acid blue 9. Discharge stability, long term storage stability, tone of the printed letters and light resistance of these recording liquid were evaluated in the same manner as in Example 1. The results revealed that all these properties were favorable, hence the liquid was highly suitable for the recording purpose.

EXAMPLES 11–18

A primary black recording liquid was prepared in the same manner as in Example 2 except that dye as shown in Table 2 and its formulation contents were used in place of C.I. food black 2 and C.I. direct blue 199. Tone of the printed letters for use in substractive color mixing for full-color image recording, discharge stability, long term storage stability and light resistance of these recording liquid were evaluated in the same manner as in Example 2. The results revealed that all these properties were favorable, hence the liquid was highly suitable for the recording purpose.

EXAMPLE 19

A primary black recording liquid for an ink jet recording was prepared according to the following formulation.

| | |
|---|---|
| C.I. food black 2 | 2 parts by weight |
| C.I. acid red 8 | 0.2 parts by weight |
| Diethyleneglycol | 30 parts by weight |
| N—methyle-2-pyrrolidone | 15 parts by weight |
| Water | balance |
| Total: | 100 parts by weight |

The above amounts of the components were thoroughly mixed to form a homogeneous solution, which was then pressure-filtered through a toflon filter having a nominal pore size of 0.45$\mu$. The filtrate was degassed with vacuum pump and made up into a recording liquid.

This recording liquid was tested for its discharge stability by using an ink-ject recorder equipped with an on-demand type of recording head which ejects recording liquid droplets by means of a piezoelectric oscillator (orifice diameter: 50$\mu$, piezoelectric oscillator driving voltage: 60 V, frequency: 4 KHz). As a result, this recording liquid maintained good discharge stability in both cases of continuous discharge and intermittent discharge for 48 hours, at surrounding temperatures of room temperature (21°) 5°, 40°, and 60° C., under a relative humidity of 30%.

Separate from the above test, long term storage stability of the recording liquid was tested for two years at 0° C., 30° C. and 60° C. No precipitation and color change occurred in the recording agent.

The printed letters exhibited an ideal clear color and black color which was not tinged with other tone. They also showed such good light resistance that the letters could sufficiently be read after 50 hour exposure in a xenon Fade-O-Meter.

EXAMPLE 20

A primary black recording liquid was prepared on the basis of the following formulation in the same manner as in Example 19.

| | |
|---|---|
| C.I. food black 2 | 3 parts by weight |
| C.I. acid red 37 | 0.1 parts by weight |
| Diethyleneglycol | 15 parts by weight |
| 1,3-dimethyle-2-imidazolidinone | 15 parts by weight |
| Polyethyleneglycol (300) | 15 parts by weight |
| Water | 53 parts by weight |

On the other hand, a primary yellow recording liquid, a primary cyan recording liquid and a primary magenta recording liquid were prepared on the basis of the above-mentioned formulation except that, in place of C.I. food black 2 and C.I. acid red 37 in the aforesaid primary black recording liquid, C.I. acid yellow 23 in the primary yellow recording liquid, C.I. direct blue 86 in the primary cyan recording liquid and C.I. acid red 35 in the primary magenta recording liquid were combined up to 2 weight %, respectively.

Color printing tests were conducted by feeding these recording liquids to an ink-jet recorder equipped with multi-heads of on-demand type which ejects recording liquid droplets by the action of thermal energy (orifice diameter 35μ, electric resistance of the heater 150Ω, operational voltage 30 V, frequency 2 KHz). The results revealed that the discharge stability was good in all cases under the same conditions as in Example 19. The resulting full-color images had the ideal colors, whereby these recording liquids were found to be excellent as primary color liquids for use in subtractive color mixing. The same light exposure test as in Example 19 showed that the printed letters could also sufficiently be read after said exposure.

EXAMPLES 21–32

A primary black recording requid was prepared in the same manner as in Example 19 except that dye as shown in Table 3 and its formulation contents were used in place of C.I. food black 2 and C.I. acid red 8. Discharge stability, long term storage stability, tone of the printed letters and light resistance of these recording liquid were evaluated in the same manner as in Example 19. The results revealed that all these properties were favorable, hence the liquid was highly suitable for the recording purpose.

EXAMPLE 33

A primary black recording liquid for an ink jet recording was prepared according to the following formulation.

| | |
|---|---|
| C.I. food black 2 | 3.0 parts by weight |
| C.I. acid yellow 17:1 | 0.3 parts by weight |
| Diethyleneglycol | 30.0 parts by weight |
| N—methyl-2-pyrrolidone | 15.0 parts by weight |
| Water | balance |
| Total: | 100 parts by weight |

The above amounts of the components were thoroughly mixed to form a homogeneous solution, which was then pressure-filtered through a teflon filter having a norminal pore size of 0.45μ. The filtrate was degassed with vaccum pump and made up into a recording liquid.

This recording liquid was tested for its discharge stability by using an ink-jet recorder equipped with an on-demand type of recording head which ejects recording liquid droplets by means of a piezoelectric oscillator (orifice diameter: 50μ, piezoelectric oscillator driving voltage: 60 V, frequency: 4 KHz). As a result, this recording liquid maintained good discharge stability in both cases of continouous discharge and intermittent discharge for 48 hours, at surrounding temperatures of room temperature (21°), 5°, 40°, and 60° C., under a relative humidity of 30%.

Separate from the above test, long term storage stability of the recording liquid was tested for two years at 0° C., 30° C. and 60° C. No precipitation and color change occurred in the recording agent.

The printed letters exhibited an ideal clear color and black color which was not tinged with other tone. They also showed such good light resistance that the letters could sufficiently be read after 50 hour exposure in a xenon Fade-O-Meter.

EXAMPLE 34

A primary black recording liquid was prepared on the basis of the following formulation in the same manner as in Example 33.

| | |
|---|---|
| C.I. food black 2 | 3.0 parts by weight |

| | |
|---|---|
| -continued | |
| C.I. acid yellow 65 | 0.2 parts by weight |
| Diethyleneglycol | 15.0 parts by weight |
| 1,3-dimethyle-2-imidazolidinone | 15.0 parts by weight |
| Polyethyleneglycol (300) | 15.0 parts by weight |
| Water | balance |

On the other hand, a primary yellow recording liquid, a primary cyan recording liquid and a primary magenta recording liquid were prepared on the basis of the above-mentioned formulation except that, in place of C.I. food black 2 and C.I. acid yellow 65 in the aforesaid primary black recording liquid, C.I. acid yellow 23 in the primary yellow recording liquid, C.I. direct blue 86 in the primary cyan recording liquid and C.I. acid red 35 in the primary magenta recording liquid were combined up to 2 weight %, respectively.

Color printing tests were conducted by feeding these recording liquids to an ink-jet recorder equipped with multi-heads of on-demand type which ejects recording liquid droplets by the action of thermal energy (orifice diameter 35μ, electric resistance of the heater 150Ω, operational voltage 30 V, frequency 2 KHz). The results revealed that the discharge stability was good in all cases under the same conditions as in Example 33. The resulting full-color images had the ideal colors, whereby these recording liquids were found to be excellent as primary color liquids for use in subtractive color mixing. The same light exposure test as in Example 33 showed that the printed letters could also sufficiently be read after said exposure.

EXAMPLES 34–45

A primary black recording requid was prepared in the same manner as in Example 33 except that dye as shown in Table 4 and its formulation contents were used in place of C.I. food black 2 and C.I. acid yellow 17:1. Discharge stability, long term storage stability, tone of the printed letters and light resistance of these recording liquid were evaluated in the same manner as in Example 33. The results revealed that all these properties were favorable, hence the liquid was highly suitable for the recording prupose.

EXAMPLE 46

A primary black recording liquid for an ink jet recording was prepared according to the following formulation.

| | |
|---|---|
| C.I. food black 2 | 3.0 parts by weight |
| C.I. acid yellow 17:1 | 0.2 parts by weight |
| C.I. acid red 8 | 0.2 parts by weight |
| Diethyleneglycol | 30.0 parts by weight |
| N—methyle-2-pyrrolidone | 15.0 parts by weight |
| Water | balance |
| Total: | 100 parts by weight |

The above amounts of the components were thoroughly mixed to form a homogeneous solution, which was then pressure-filtered through a teflon filter having a nominal pore size of 0.45μ. The filtrate was degassed with vacuum pump and made up into a recording liquid.

This recording liquid was tested for its discharge stability by using an ink-jet recorder equipped with an on-demand type of recording head which ejects recording liquid droplets by means of a piezoelectric oscillator (orifice diameter: 50μ, piezoelectric oscillator driving voltage: 60 V, frequency: 4 KHz). As a result, this recording liquid maintained good discharge stability in both cases of continuous discharge and intermittent discharge for 48 hours, at surrounding temperatures of room temperature (21°), 5°, 40°, and 60° C., under a relative humidity of 30%.

Separate from the above test, long term storage stability of the recording liquid was tested for two years at 0° C., 30° C. and 60° C. No precipitation and color change occurred in the recording agent.

The printed letters exhibited an ideal clear color and black color which was not tinged with other tone. They also showed such good light resistance that the letters could sufficiently be read after 50 hour exposure in a xenon Fade-O-Meter.

EXAMPLE 47

A primary black recording liquid was prepared on the basis of the following formulation in the same manner as in Example 46.

| | |
|---|---|
| C.I. food black 2 | 3.0 parts by weight |
| C.I. acid yellow 65 | 0.1 parts by weight |
| C.I. acid red 37 | 0.2 parts by weight |
| Diethyleneglycol | 15.0 parts by weight |
| 1,3-dimethyle-2-imidazolidinone | 15.0 parts by weight |
| Polyethyleneglycol (300) | 15.0 parts by weight |
| Water | balance |
| Total: | 100 parts by weight |

On the other hand, a primary yellow recording liquid, a primary cyan recording liquid and a primary magenta recording liquid were prepared on the basis of the above-mentioned formulation except that, in place of C.I. food black 2, C.I. acid yellow 65 and C.I. acid red 37 in the aforesaid primary black recording liquid, C.I. acid yellow 23 in the primary yellow recording liquid, C.I. direct blue 86 in the primary cyan recording liquid and C.I. acid red 35 in the primary magenta recording liquid were combined up to 2 weight %, respectively.

Color printing tests were conducted by feeding these recording liquids to an ink-jet recorder equipped with multi-heads of on-demand type which ejects recording liquid droplets by the action of thermal energy (orifice diameter 35μ, electric resistance of the heater 150Ω, operational voltage 30 V, frequency 2 KHz). The results revealed that the discharge stability was good in all cases under the same conditions as in Example 46. The resulting full-color images had the ideal colors, whereby these recording liquids were found to be excellent as primary color liquids for use in subtractive color mixing. The same light exposure test as in Example 46 showed that the printed letters could also sufficiently be read after said exposure.

EXAMPLES 48-59

A primary black recording requid was prepared in the same manner as in Example 46 except that dye as shown in Table 5 and Table 6 and its formulation contents were used in place of C.I. food black 2, C.I. acid yellow 17:1 and C.I. acid red 8. Discharge stability, long term storage stability, tone of the printed letters and light resistance of these recording liquid were evaluated in the same manner as in Example 46. The results revealed that all these properties were favorable, hence the liquid was highly suitable for the recording purpose.

TABLE 1

| Example No. | C.I. food black 2 | Blue dye |
|---|---|---|
| 3 | (2.0) | C.I. acid blue 185 (2.0) |
| 4 | (2.0) | C.I. acid blue 254 (2.0) |
| 5 | (1.0) | C.I. acid blue 249 (3.0) |
| 6 | (1.0) | C.I. acid blue 83 (3.0) |
| 7 | (1.0) | C.I. direct blue 149 (3.0) |
| 8 | (1.0) | C.I. direct blue 166 (3.0) |
| 9 | (1.0) | C.I. direct blue 87 (3.0) |
| 10 | (1.0) | C.I. acid blue 9 (1.0) C.I. acid blue 138 (2.0) |

Dye and its formulation contents (parts by weight)

TABLE 2

| Example No. | C.I. food black 2 | Blue dye |
|---|---|---|
| 11 | (3.0) | C.I. acid blue 13 (0.5) |
| 12 | (3.0) | C.I. acid blue 68 (0.5) |
| 13 | (4.0) | C.I. acid blue 69 (0.5) |
| 14 | (4.0) | C.I. acid blue 138 (0.5) |
| 15 | (4.0) | C.I. direct blue 95 (0.5) |
| 16 | (4.0) | C.I. direct blue 86 (0.5) |
| 17 | (4.0) | C.I. direct blue 176 (0.5) |
| 18 | (5.0) | C.I. direct blue 199 (0.5) C.I. direct blue 149 (0.5) |

Dye and its formulation contents (parts by weight)

TABLE 3

| Example No. | C.I. food black 2 | Red dye |
|---|---|---|
| 21 | (3.0) | C.I. acid red 50 (0.3) |
| 22 | (3.0) | C.I. acid red 51 (0.3) |
| 23 | (3.0) | C.I. acid red 52 (0.1) |
| 24 | (3.0) | C.I. acid red 87 (0.1) |
| 25 | (3.0) | C.I. acid red 92 (0.1) |
| 26 | (3.0) | C.I. acid red 93 (0.1) |
| 27 | (4.0) | C.I. acid red 95 (0.5) |
| 28 | (4.0) | C.I. acid red 98 (0.5) |
| 29 | (4.0) | C.I. acid red 287 (0.5) |
| 30 | (4.0) | C.I. acid red 35 (0.3) |
| 31 | (4.0) | C.I. acid red 1 (0.3) |
| 32 | (4.0) | C.I. acid red 8 (0.1) |

Dye and its formulation contents (parts by weight)

TABLE 3-continued

| Example No. | Dye and its formulation contents (parts by weight) | |
|---|---|---|
| | C.I. food black 2 | Red dye |
| | | C.I. acid red 93 (0.2) |

TABLE 4

| Example No. | Dye and its formulation contents (parts by weight) | |
|---|---|---|
| | C.I. food black 2 | Yellow dye |
| 34 | (3.0) | C.I. acid yellow 49 (0.5) |
| 35 | (3.0) | C.I. acid yellow 65 (0.4) |
| 36 | (3.0) | C.I. acid yellow 104 (0.5) |
| 37 | (3.0) | C.I. acid yellow 155 (0.8) |
| 38 | (3.0) | C.I. acid yellow 183 (0.1) |
| 39 | (3.0) | C.I. acid yellow 194 (0.2) |
| 40 | (3.0) | C.I. direct yellow 86 (0.2) |
| 41 | (4.0) | C.I. direct yellow 106 (0.2) |
| 42 | (4.0) | C.I. direct yellow 142 (0.2) |
| 43 | (4.0) | C.I. direct yellow 194 (0.2) |
| 44 | (4.0) | C.I. acid yellow 23 (0.2) C.I. acid yellow 183 (0.1) |
| 45 | (4.0) | C.I. acid yellow 49 (0.1) C.I. acid yellow 142 (0.1) |

TABLE 5

| Example No. | Dye and its formulation contents (parts by weight) | |
|---|---|---|
| | C.I. food black 2 | Yellow dye and red dye |
| 48 | (3.0) | C.I. acid yellow 49 (0.2) C.I. acid red 50 (0.1) |
| 49 | (3.0) | C.I. acid yellow 65 (0.3) C.I. acid red 52 (0.3) |
| 50 | (3.0) | C.I. acid yellow 104 (0.3) C.I acid red 87 (0.2) |
| 51 | (3.0) | C.I. acid yellow 155 (0.2) C.I. acid red 92 (0.3) |
| 52 | (3.0) | C.I. acid yellow 183 (0.3) C.I. acid red 93 (0.1) |
| 53 | (3.0) | C.I. acid yellow 194 (0.3) C.I. acid red 95 (0.1) |
| 54 | (4.0) | C.I. direct yellow 86 (0.1) C.I. acid red 98 (0.1) |

TABLE 6

| Example No. | Dye and its formulation contents (parts by weight) | |
|---|---|---|
| | C.I. food black 2 | Yellow dye and red dye |
| 55 | (4.0) | C.I. direct yellow 106 (0.2) C.I. acid red 287 (0.2) |
| 56 | (4.0) | C.I. direct yellow 142 (0.3) C.I. acid red 35 (0.3) |
| 57 | (4.0) | C.I. direct yellow 194 (0.1) C.I. acid red 287 (0.05) C.I. acid red 93 (0.05) |
| 58 | (4.0) | C.I. acid yellow 23 (0.2) C.I. acid yellow 183 (0.1) C.I. acid red 50 (0.1) |
| 59 | (4.0) | C.I. acid yellow 49 (0.1) C.I. direct yellow 142 (0.1) C.I. acid red 8 (0.1) C.I. acid red 51 (0.1) |

What we claim is:

1. A recording liquid comprising a liquid composition having water-soluble dyes as a coloring component, wherein said coloring component is C.I. Food Black 2 and a member of the group consisting of at least one water-soluble blue dye, at least one water-soluble red dye, at least one water-soluble yellow dye and mixtures thereof wherein the weight ratio of the yellow colored dye to the Food Black 2 is from about 1:100 to 30:100; the weight ratio of the red colored dye to the Food Black 2 is from about 1:100 to 30:100 and the weight ratio of the blus colored dye to the Food Black 2 is from about 1:10 to 10:1.

2. A recording liquid composition comprising a liquid composition having a coloring component, wherein said coloring component is C.I. Food Black 2 and at least one water soluble blue dye, wherein the weight ratio of said blue dye to said Food Black 2 is from about 1:10 to 10:1.

3. A recording liquid composition comprising a liquid composition having a colorant component, wherein said coloring component is C.I. Food Black 2 and a member of the group consisting of at least one water soluble red dye, at least one water soluble yellow dye and mixtures thereof, wherein the weight ratio of the red dye to the Food Black 2 is from about 1:100 to 30:100 and the weight ratio of the yellow dye to the Food Black 2 is from about 1:100 to 30:100.

4. A recording liquid according to claim 1, wherein said liquid composition is an aqueous solution.

5. A recording liquid according to claim 1, wherein the content of said coloring component in the recording liquid is in the range of 0.5 to 20% by weight based on the total weight of the recording liquid.

6. A recording liquid according to claim 2, wherein said blue color dye is selected from the group consisting of C.I. Acid Blue 9 C.I. Acid Blue 13, C.I. Acid Blue 68, C.I. Acid Blue 69, C.I. Acid Blue 138, C.I. Acid Blue 185, C.I. Acid Blue 249, C.I. Acid Blue 258, C.I. Direct Blue 83, C.I. Direct Blue 86, C.I. Direct Blue 87, C.I. Direct Blue 95, C.I. Direct Blue 149, C.I. Direct Blue 166, C.I. Direct Blue 176 and C.I. Direct Blue 199.

7. A recording liquid according to claim 2, wherein said liquid composition is an aqueous solution.

8. A recording light according to claim 3, wherein said liquid composition is an aqueous solution.